(12) United States Patent
Brunner et al.

(10) Patent No.: US 11,964,320 B2
(45) Date of Patent: Apr. 23, 2024

(54) METHOD FOR PRODUCING A FLAT TUBE

(71) Applicant: MAHLE INTERNATIONAL GMBH, Stuttgart (DE)

(72) Inventors: Steffen Brunner, Weissach im Tal (DE); Sven Strücker, Ebhausen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 0 days.

(21) Appl. No.: 17/994,540

(22) Filed: Nov. 28, 2022

(65) Prior Publication Data

US 2023/0166317 A1 Jun. 1, 2023

(30) Foreign Application Priority Data

Dec. 1, 2021 (DE) .......................... 102021131552.2

(51) Int. Cl.
*B21D 53/06* (2006.01)
*B21C 37/15* (2006.01)
*B21D 53/04* (2006.01)

(52) U.S. Cl.
CPC ............ *B21D 53/06* (2013.01); *B21C 37/158* (2013.01); *B21D 53/04* (2013.01)

(58) Field of Classification Search
CPC ........ B21D 53/06; B21D 53/04; B21D 5/015; B21C 37/158; B21C 37/225; F28F 2275/067; F28F 1/40; F28F 1/04; F28F 21/083; F28F 13/12; F28F 21/084; F28F 2275/04; F28F 1/02; F28F 9/18; B23P 15/26; B23K 26/21
See application file for complete search history.

(56) References Cited

U.S. PATENT DOCUMENTS

| 4,982,784 A | 1/1991 | Rhodes | |
|---|---|---|---|
| 6,423,423 B2 * | 7/2002 | Akutsu | B21D 5/086 428/595 |
| 6,539,628 B2 * | 4/2003 | Akutsu | B21D 5/086 72/368 |
| 6,928,847 B2 * | 8/2005 | Akutsu | B21D 53/04 72/182 |

(Continued)

FOREIGN PATENT DOCUMENTS

DE    102005050366    4/2006

*Primary Examiner* — Lawrence Averick
(74) *Attorney, Agent, or Firm* — Barnes & Thornburg LLP

(57) ABSTRACT

A method for producing a flat tube for a heat exchanger, in particular for a motor vehicle, having a first wall, a second wall opposite to the first wall, having a third wall connecting the first and second wall, having a fourth wall connecting the second and first wall, wherein the first and second wall are longer than the third and fourth wall, having an interior for a medium to flow through, wherein a turbulence insert is arranged in the interior, wherein the method comprises at least the following process steps: —providing a plate material—forming the plate material into an intermediate tube in such a way that the plate material is crowned in at least two sections and the sections at least partially form the first and second wall of the flat tube and the intermediate tube forms an opening in the area one of the two third or fourth walls—providing and inserting a turbulence insert into the interior—closing the opening by means of a welding method.

9 Claims, 2 Drawing Sheets

(56) References Cited

U.S. PATENT DOCUMENTS

Figure 1:
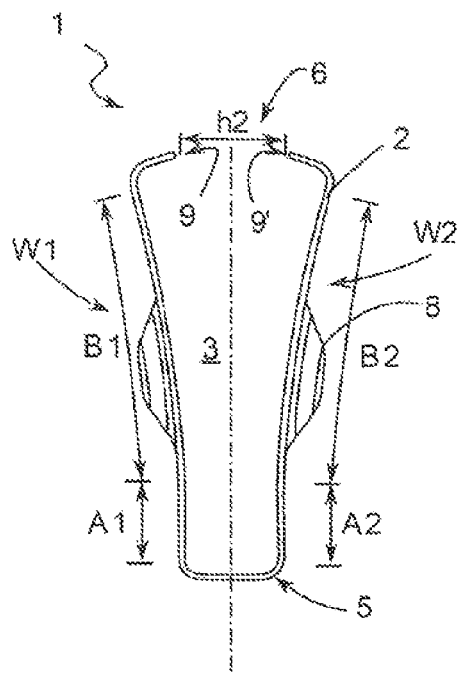

| | | | | |
|---|---|---|---|---|
| 7,614,443 B2* | 11/2009 | Usui | ................ | F28F 3/025 |
| | | | | 165/177 |
| 7,886,440 B2* | 2/2011 | Hashimoto | ............ | B21D 53/02 |
| | | | | 29/890.03 |
| 7,921,559 B2* | 4/2011 | Zobel | ................ | B21C 37/22 |
| | | | | 29/890.032 |
| 8,091,621 B2* | 1/2012 | Zobel | ................ | B21C 37/157 |
| | | | | 165/177 |
| 8,191,258 B2* | 6/2012 | Zobel | ................ | F28D 1/0391 |
| | | | | 29/890.038 |
| 8,281,489 B2* | 10/2012 | Zobel | ................ | B23K 31/02 |
| | | | | 83/42 |
| 8,438,728 B2* | 5/2013 | Zobel | ................ | B21C 37/22 |
| | | | | 165/177 |
| 8,656,987 B2* | 2/2014 | Natali | ................ | F28D 1/035 |
| | | | | 165/172 |
| 8,683,690 B2* | 4/2014 | Zobel | ................ | B21C 37/151 |
| | | | | 165/177 |
| 8,726,508 B2* | 5/2014 | Zobel | ................ | B21C 37/151 |
| | | | | 165/177 |
| 2001/0053457 A1* | 12/2001 | Akutsu | ................ | B21D 53/04 |
| | | | | 428/595 |
| 2002/0134126 A1* | 9/2002 | Akutsu | ................ | B21D 5/086 |
| | | | | 72/182 |
| 2006/0265874 A1* | 11/2006 | Hashimoto | ............ | B21D 53/02 |
| | | | | 29/890.049 |
| 2007/0056721 A1* | 3/2007 | Usui | ................ | F28D 7/1684 |
| | | | | 165/183 |
| 2009/0019689 A1* | 1/2009 | Zobel | ................ | B21C 37/158 |
| | | | | 29/727 |
| 2012/0312517 A1* | 12/2012 | Natali | ................ | F28D 1/035 |
| | | | | 165/177 |

\* cited by examiner

METHOD FOR PRODUCING A FLAT TUBE

CROSS-REFERENCE TO RELATED APPLICATIONS

This application claims priority under 35 USC § 119 of German Patent Application No. DE102021131552.2, filed on Dec. 1, 2021, the entirety of which is hereby incorporated by reference herein.

The invention relates to a method for producing a flat tube for a heat exchanger, in particular for a motor vehicle, and a soldered heat exchanger having at least one flat tube.

Such a generic production method for a flat tube is known, for example, from DE 10 2005 050 366 A1, wherein here the flat tube is open on one side to accommodate a turbulence insert but has straight walls which form the longitudinal sides of the flat tube in the finished tube.

The method according to the disclosure for producing a flat tube having the features of as disclosed herein has the advantage in relation thereto that due to the crowned shape of the longitudinal walls of the flat tube, when the flat tube is closed, the turbulence insert is advantageously pressed against the wall by the crowned walls and thus, in a later soldering procedure, when the heat exchanger has been completely soldered, an ideal soldering contact is achieved between the flat tube and the turbulence insert. This ensures not only the strength, in particular the resistance to thermal cycling, but also the heat transfer between the flat tube and the turbulence insert.

A flat tube according to the disclosure for a heat exchanger has a first wall and a second wall opposite to the first wall. These two walls form the long side of the flat tube in the profile view. The two short sides are formed by a third and a fourth wall so that a corresponding flat tube is formed. The transitions between the individual walls are advantageously provided with rounded transitions in order not to form excessively sharp edges that would produce stress peaks in the material and weaken the tube at these corners. It is also conceivable that the complete third and fourth wall is designed as an arc, which in each case merges continuously into the first and second wall. The walls enclose an interior of the flat tube, in which a medium typically flows in the fully assembled heat exchanger. This can be a coolant, oil, or also a gaseous fluid such as exhaust gas or air. A turbulence insert is introduced into the interior. Such a turbulence insert is usually folded and/or rolled from a very thin metal sheet and is designed in such a way that when a medium flows through the interior space, it is deflected and redirected in a specific way and thus generates turbulence. This enables a significantly higher heat transfer from the medium flowing through to the tube. The turbulence insert also has to be designed in such a way that the lowest possible pressure loss is generated while still enabling good heat transfer. The turbulence insert also absorbs heat and dissipates it to the tube walls. The turbulence insert can simply be inserted into the flat tube, or it can also be soldered to the walls at each contact point using a soldering process.

A good surface contact between the turbulence insert and the walls of the flat tube is required for good soldering or for good heat transfer in the case of a non-soldered turbulence insert. For soldering, either a correspondingly solder-plated plate material or a separately introduced solder foil is required between the turbulence insert and the flat tube. In addition to good heat transfer, a soldered turbulence insert also has the advantage of a very high strength increase of the flat tube, in particular increased resistance to thermal cycling.

Depending on the area of application and the medium to be cooled, the flat tubes can be manufactured from stainless steel or aluminum. The turbulence insert can also be manufactured from aluminum and/or stainless steel. Stainless steels are used in particular in applications with exhaust gas or other corrosive media. However, this does not influence the production of the flat tube.

The method according to the invention for producing a flat tube comprises the following process steps. In a first step, a plate material is provided for forming the flat tube. This can be a single plate or sheet metal or a long sheet-metal web that is either unrolled from a large roll or provided in some other way. In the production device, the plate material provided is formed into an intermediate tube. This can be carried out in one or also in multiple successive production steps. In this case, either the forming tool is changed in succession and the plate material is thus formed in directly successive forming steps, or the plate material can be formed in succession in forming tools arranged directly in succession. In particular, a particularly long plate material unwound from a large roll can thus be formed into an intermediate tube.

The intermediate tube is formed in such a way that the plate material is crowned in at least two sections and the sections at least partially form the first and second walls and thus the long sides of the flat tube. The crowned sections are formed in such a way that the walls are bent inwards towards the middle of the finished tube. The complete wall can be crowned. In one particularly advantageous embodiment, a part of the first and second wall can first be made straight and then a crowned section can follow with a continuous transition thereon. Starting from the third or fourth wall, a first section of the first and second wall is formed straight and parallel to one another. This is adjoined in each case by a section that is crowned inwards towards the center of the finished tube. At least a part of the third or fourth wall, which forms the still open separation point of the flat tube, follows the crowned section.

Based on the total width b, i.e., the length of the long side of the flat tube formed by the first and second wall, the straight section has a length of 5% to 40%, in a particularly advantageous embodiment between 10 and 20% of the total width b. The turbulence insert that is introduced is held in its final position by the straight section, which already largely corresponds to the profile of the finished flat tube in this area. In particular, these straight sections ensure that the turbulence insert has particularly good contact on the first and second walls of the flat tube when the tube is later closed.

The flat tube is still open in the area of either the third or fourth wall, so that an opening is formed there. This opening is used to insert the turbulence insert into the interior of the flat tube. For this purpose, the turbulence insert is provided accordingly and introduced into the interior of the flat tube. After the turbulence insert has been introduced, the flat tube is closed using a welding process.

In order that the turbulence insert can be introduced advantageously, the height h2 of the opening formed is at least as large as 80% to 120% of the height h of the interior of the flat tube. The turbulence insert can thus be introduced directly through the opening into the interior of the flat tube by only slightly opening the opening or, particularly advantageously, without further measures.

The opening formed in the intermediate tube is primarily formed by the at least partially crowned first and second walls of the flat tube. After the turbulence inserts have been inserted, the flat tube is no longer formed using a forming tool, rather the opening is only held closed by applying a force and then welded. The butt joints of the formed plate material particularly advantageously abut one another. A particularly good weld seam can thus be achieved. For example, a welding method without the introduction of additional welding means, such as a welding wire or the like, can also be used.

Laser welding or electrode beam welding could be mentioned here as an example of a suitable welding process, both of which cause local melting of the material so that the flat tube is securely welded at the joint.

If the flat tube were to be closed without a turbulence insert, the first and second walls would point concavely inward due to the crowned shape. Therefore, the flat tube produced in this way is advantageously only to be used with a turbulence insert inserted into the flat tube. The concave walls are supported on the inserted turbulence insert and thus enable the walls to be pressed well against the turbulence insert. In a soldering process carried out later, this results in a particularly good soldered connection between the flat tube and the turbulence insert.

In a further advantageous embodiment of the production method according to the invention, the plate material is provided with projections before or after being provided for forming. On the one hand, these projections can advantageously promote the flow in the flat tubes, but they can also serve as spacers for the later installation state in a heat exchanger. For this purpose, two flat tubes are positioned adjacent to one another or one above the other in such a way that a projection comes into contact on each one of the flat tubes. A solid composite of flat tubes can thus be produced by appropriate solder plating or coating of the plate material, in particular in the contact area.

The dimensions of the flat tube are produced type-specifically, based on the specifications of the heat exchanger. A heat exchanger usually consists of a large number of flat tubes that are provided in a tube bundle. The ends of the flat tubes are accommodated in tube sheets, each of which has an opening for each flat tube. The sheets partially enclose a collection space that is closed using a cover. This collection space then has appropriate fittings for the supply or discharge of a medium that flows through the flat tubes. The flat tubes themselves can also have ribs between the individual flat tubes, which are additionally introduced into the tube bundle and thus enable a particularly good heat transfer from the flat tubes to a medium flowing around the flat tubes. The space having the flat tubes can also be enclosed by a housing, so that a further space through which a flow can take place results. However, it is also possible that the flat tubes can have free flow through them and thus ideally have ambient air flow through them, which is supplied as airstream either by a fan or by the movement of the vehicle.

The tube bundles having the arranged sheets and optionally also covers are usually soldered in a brazing furnace to form a solid composite, which is also sealed with respect to the connections of the flat tubes to the sheets. In this work step, the turbulence insert introduced into the flat tube is then also soldered to the flat tube. The solidly soldered composite and in particular also the dimensional stability of the flat tubes, which is advantageously achieved by particularly good soldering of the turbulence inserts to the flat tubes, can increase the resistance to thermal cycling of the heat exchanger. Thermal cycling is a more frequent, larger temperature change in the heat exchanger, for example due to the sudden switching on of the cooler in a cooling circuit as needed, because there is a temporary high cooling requirement, for example when a truck is driving uphill and a fuel cell or internal combustion engine thus causes a large introduction of heat into a cooling system.

As a result of these temperature fluctuations, the heat exchanger is exposed to great mechanical stress due to the temperature-related expansion of the components, which over time can then result in damage at critical points of the components, at which stress peaks occur.

Depending on the intended use of the heat exchanger, a medium to be cooled can thus be conducted through the flat tubes, wherein a cooling medium such as coolant or also air flows through the flat tubes. An exhaust gas heat exchanger could be designed in this way, wherein the exhaust gas to be cooled, which can originate from an internal combustion engine, but also from a fuel cell, is conducted through the flat tubes and a coolant is conducted in the space around the flat tubes. However, the flat tubes produced in this way can also be used in other types of heat exchangers, for example, coolant heat exchangers, charge-air heat exchangers, or condensers.

Figure 2:
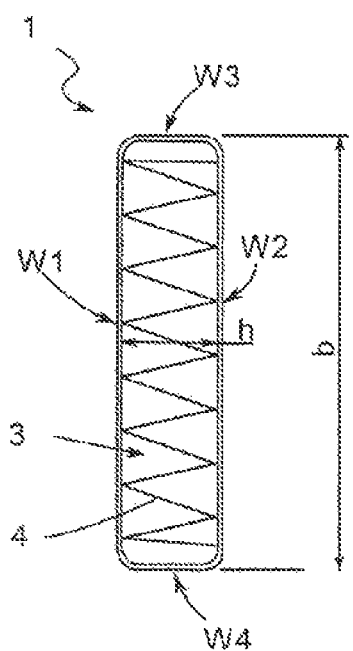
Figure 3:
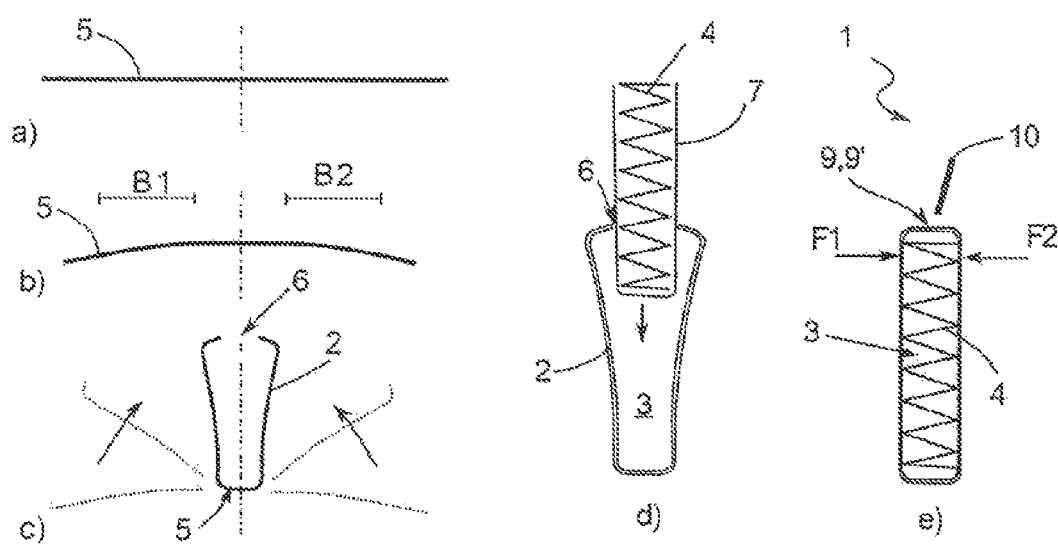

Further advantageous embodiments of the invention are described by the following descriptions of the figures. In the figures:

FIG. 1 shows a flat tube according to the invention formed as an intermediate tube FIG. 2 shows a flat tube according to the invention as a finished tube FIG. 3 shows a schematic representation of the individual process steps for producing the flat tube

PREFERRED EMBODIMENT OF THE DISCLOSURE

FIG. 1 shows a flat tube 1 according to the disclosure formed as an intermediate tube 2. The intermediate tube 2 is formed in such a way that the plate material 5 is crowned in at least two sections B1 and B2 and the sections B1, B2 at least partially form the first and second wall W1 and W2 and thus the long sides of the flat tube 1.

The crowned sections B1, B2 are formed in such a way that the walls W1, W2 are bent inwards towards the middle of the finished tube. Only part of the first and second wall W1, W2 is crowned in the sections B1, B2. The first part of the wall W1, W2 is made straight in the sections A1, A2 and then merges continuously into the crowned sections B1, B2. However, it is also conceivable that the entire walls W1, W2 are crowned. However, the straight sections A1, A2 are advantageously later used to securely hold the turbulence insert 4 arranged in the flat tube 1 in the correct position until the flat tube 1 is welded closed, since the flat tube 1 in this area already largely corresponds to the subsequent contour of the finished flat tube 1. The straight sections A1, A2 each have a length of 5% to 40% based on the overall width b of the flat tube 1. In a particularly advantageous manner, the length is between 10% and 20%.

Therefore, starting from the third or fourth wall W3, W4, a first section A1, A2 of the first and second wall W1, W2 is formed straight and in parallel to one another. This is adjoined in each case by the sections B1, B2 that are crowned inwards towards the center of the finished tube. A part of the third and fourth wall W3, W4, which form the opening 6 of the intermediate tube 2, follows at least partially after the crowned sections B1, B2. In the region of the opening 6, the free ends of the plate material 5 form butt joints 9, 9' which are later welded to one another by a welded bond in the finished flat tube.

The opening 6 ideally has a minimum width h2 that is greater than or nearly corresponds to the height h of the interior 3. The turbulence insert 4 to be arranged in the interior 3 can thus be easily inserted. Alternatively, the tube would have to be pressed open slightly in the elastic area and thus without further deforming the walls in order to insert the turbulence insert 4.

The flat tube 1 can have projections 8 on its long side surfaces, which are formed by the first and second walls W1, W2, which can be used as contact points between the flat tubes 1 arranged adjacent to one another for optimized turbulence of the fluid circulating in the flat tube or for the soldering in a later tube composite in a heat exchanger.

FIG. 2 shows a flat tube 1 according to the invention in the finished state. The walls W1 and W2 and the walls W3 and W4 are each aligned parallel to one another and form the outer border of the flat tube 1, wherein the walls W3 and W4 form the short sides and the walls W1 and W2 form the long sides of the flat tube 1. Radii are provided in the transition to the walls, which are advantageous for any stress peaks and thus increase the load capacity of the tubes. It is also conceivable that the walls W3 and W4 are shaped as a continuous arc. The total width b of the flat tube 1 is multiple times greater than the inner height of the flat tube. The wall thickness of the flat tube 1 and thus also the thickness of the plate material 5 used typically ranges from 0.1 mm to 1.5 mm. Depending on the application, the flat tubes 1 are expediently produced from aluminum or stainless steel, wherein the stainless steel tubes are suitable, for example, in gas heat exchangers such as exhaust gas coolers or coolers for fuel cell applications and aluminum tubes for use with coolants or oil. The decisive factor here is whether the medium to be cooled contains aggressive substances that attack the material, as is the case with exhaust gas coolers, for example. Combustion residues are contained in the exhaust gases here, which can condense together with the water contained in the exhaust gas and, as an acidic or basic fluid, would thus quickly damage an aluminum flat tube 1.

The turbulence insert 4 is arranged in the interior 3 of the flat tube 1. The walls W1 and W2 press on the turbulence insert 4 and are thus shaped parallel to one another. Without the turbulence insert 4 they would be crowned inwards. The flat tube 3 is later inserted as an assembly with further flat tubes 3 with each of their tube ends in a tube sheet and then soldered to form a heat exchanger. So that the connection between the tube sheet and the flat tube 3 can be tightly soldered, the opening of the tube sheet and the contour of the flat tube 1 have to be congruent so that only a small gap results. The flat tube 3 therefore has to have a very high dimensional accuracy after welding.

In steps a) to e), FIG. 3 shows the individual process steps for producing a flat tube 3 according to the invention. In a first step, the plate material 5 is provided. The intermediate tube 2 is formed in a first forming step b) and a directly following forming step c). Depending on the design of the forming device, the forming procedures shown in steps b) and c) can also be carried out in one or more than two steps. The exemplary representation of the forming procedure is only one possible embodiment here and does not show the required steps exhaustively. In following step d), the turbulence insert 4 is at least partially wrapped with a solder foil 7 and then introduced through the opening 6 in the intermediate tube 2 into the interior 3 and positioned there. Instead of the solder foil 7, the plate material 5 or the turbulence insert 4 itself can also be solder-plated. This means that the auxiliary materials required for the soldering process have been applied to the respective material before the assembly.

In a final step e), the intermediate tube 2 is pressed together by a device by means of force application F1, F2 in such a way that the butt joints 9, 9' remain resting on top of one another. This is followed by welding the tube closed by means of a welding method, particularly advantageously by means of a beam welding method, in particular by means of laser welding 10. The flat tube 1 is thus finished and can be used for further use for installation in a heat exchanger. The final soldering connection of the flat tube 1 to the turbulence insert 4 arranged in the interior 3 is advantageously carried out in the final soldering process in which the complete heat exchanger is finish-soldered.

The application is best understood with reference to the following Numbered Paragraphs:

Numbered Paragraph 1: A method for producing a flat tube (1) for a heat exchanger, in particular for a motor vehicle, having a first wall (W1), a second wall (W2) opposite to the first wall (W1), having a third wall (W3) connecting the first and second wall (W1, W2), having a fourth wall (W4) connecting the second and first wall (W2, W1), wherein the first and second wall are longer than the third and fourth wall, having an interior (3) for a medium to flow through, wherein a turbulence insert (4) is arranged in the interior (3), wherein the method comprises at least the following process steps:—providing a plate material (5)—forming the plate material (5) into an intermediate tube (2) in such a way that the plate material (5) is crowned in at least two sections (B1, B2) and the sections (B1, B2) at least partially form the first and second wall (W1, W2) of the flat tube (1) and the intermediate tube (2) forms an opening (6) in the area one of the two third or fourth walls (W3, W4)—providing and inserting a turbulence insert (4) into the interior (3)—closing the opening (6) by means of a welding method.

Numbered Paragraph 2: The method for producing a flat tube (1) of Numbered Paragraph 1, wherein, in the intermediate tube (2) produced during the forming process, the opposing first and second wall (W1, W2) are oriented in parallel to one another in a straight section (A1) or (A2) adjoining the third wall (W3) or fourth wall (W4) and the crowned section (B1) adjoins the first straight section (A1) and the crowned section (B2) adjoins the second straight section (A2).

Numbered Paragraph 3: The method for producing a flat tube (1) of Numbered Paragraph 2, wherein the length of the straight sections (A1) and (A2) is 5% to 40%, in particular 10% to 20%, of the total width b of the flat tube (1).

Numbered Paragraph 4: The method for producing a flat tube (1) of Numbered Paragraph 3, wherein the crowned sections (B1) and (B2) are oriented in such a way that the height h2 of the opening (6) in the intermediate tube (2) is at least as large as 80% to 120% of the height h of the interior (3) of the flat tube (1).

Numbered Paragraph 5: The method for producing a flat tube (1) of any one of the preceding Numbered Paragraphs, wherein the turbulence insert (4) is at least partially wrapped with a solder foil (7) before being inserted into the interior (3).

Numbered Paragraph 6: The method for producing a flat tube (1) of any one of the preceding Numbered Paragraphs, wherein the turbulence insert (4) is introduced through the opening (6) into the interior (3).

Numbered Paragraph 7: The method for producing a flat tube (1) of any one of the preceding Numbered Paragraphs, wherein the plate material (5) is provided with projections (8) before or after being provided.

Numbered Paragraph 8: The method for producing a flat tube (1) of any one of the preceding Numbered Paragraphs, wherein the intermediate tube (2) is held closed before it is closed by applying a force (F1, F2) to the first and second wall (W1, W2), so that the opening (6) is closed, in particular the butt joints (9, 9') of the formed plate material (5) abut one another in a blunt manner.

Numbered Paragraph 9: The method for producing a flat tube (1) of any one of the preceding Numbered Paragraphs, wherein the intermediate tube (2) is closed by means of laser welding (10).

Numbered Paragraph 10: A heat exchanger for a motor vehicle having at least one flat tube (1) produced as claimed in any one of the preceding Numbered Paragraphs, wherein the heat exchanger is soldered and the flat tubes are formed from aluminum or stainless steel.

LIST OF REFERENCE SIGNS 1 flat tube
2 intermediate tube
3 interior
4 turbulence insert
5 plate material
6 opening
7 solder foil
8 projection
9,9' joint
10 laser beam
A1,A2 first and second straight section
B1,B2 first and second crowned section
W1 first wall
W2 second wall
W3 third wall
W4 fourth wall
F1,F2 forces
b total width of the flat tube
h height of the interior of the flat tube
h2 width of the opening of the intermediate tube

The invention claimed is:

1. A method for producing a flat tube for a heat exchanger, in particular for a motor vehicle, having a first wall, a second wall opposite to the first wall, having a third wall connecting the first and second wall, having a fourth wall connecting the second and first wall, wherein the first and second wall are longer than the third and fourth wall, having an interior for a medium to flow through, wherein a turbulence insert is arranged in the interior, wherein the method comprises at least the following process steps: —providing a plate material—forming the plate material into an intermediate tube in such a way that the plate material is crowned in at least two sections and the sections at least partially form the first and second wall of the flat tube and the intermediate tube forms an opening in the area one of the two third or fourth walls—providing and inserting a turbulence insert into the interior—closing the opening by means of a welding method.

2. The method for producing a flat tube of claim 1, wherein, in the intermediate tube produced during the forming process, the opposing first and second wall are oriented in parallel to one another in a straight section or adjoining the third wall or fourth wall and the crowned section adjoins the first straight section and the crowned section adjoins the second straight section.

3. The method for producing a flat tube of claim 2, wherein the length of the straight sections and is 5% to 40%, in particular 10% to 20%, of the total width b of the flat tube.

4. The method for producing a flat tube of claim 3, wherein the crowned sections and are oriented in such a way that the height h2 of the opening in the intermediate tube is at least as large as 80% to 120% of the height h of the interior of the flat tube.

5. The method for producing a flat tube of claim 1, wherein the turbulence insert is at least partially wrapped with a solder foil before being inserted into the interior.

6. The method for producing a flat tube of claim 1, wherein the turbulence insert is introduced through the opening into the interior.

7. The method for producing a flat tube of claim 1, wherein the plate material is provided with projections before or after being provided.

8. The method for producing a flat tube of claim 1, wherein the intermediate tube is held closed before it is closed by applying a force to the first and second wall, so that the opening is closed, in particular the butt joints of the formed plate material abut one another in a blunt manner.

9. The method for producing a flat tube of claim 1, wherein the intermediate tube is closed by means of laser welding.

* * * * *